Nov. 8, 1938.　　　　P. W. TOEWS　　　　2,135,924
TURNTABLE
Filed Sept. 4, 1936　　　3 Sheets-Sheet 1

INVENTOR
Peter W. Toews
DECEASED
By:-Peter B. Toews and Henry L. Toews
EXECUTORS
By Ralph Burch
Attorney

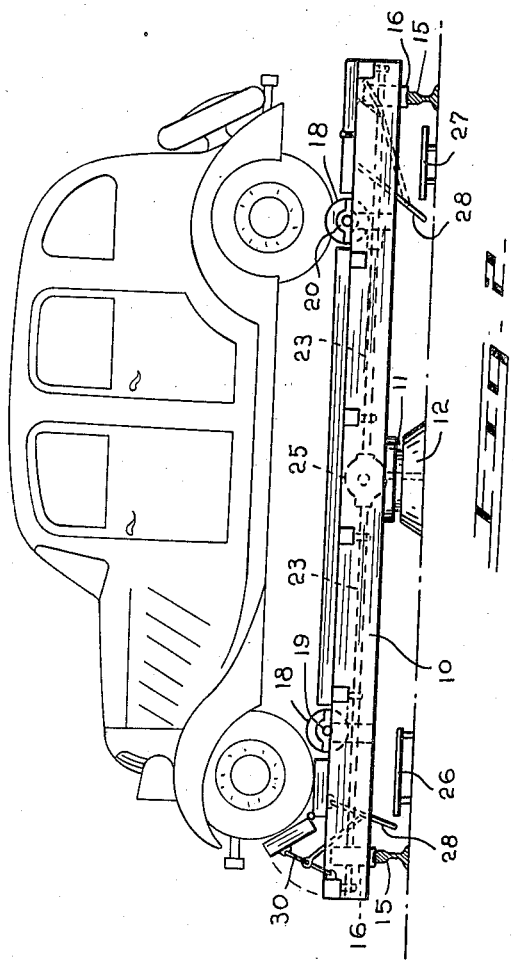

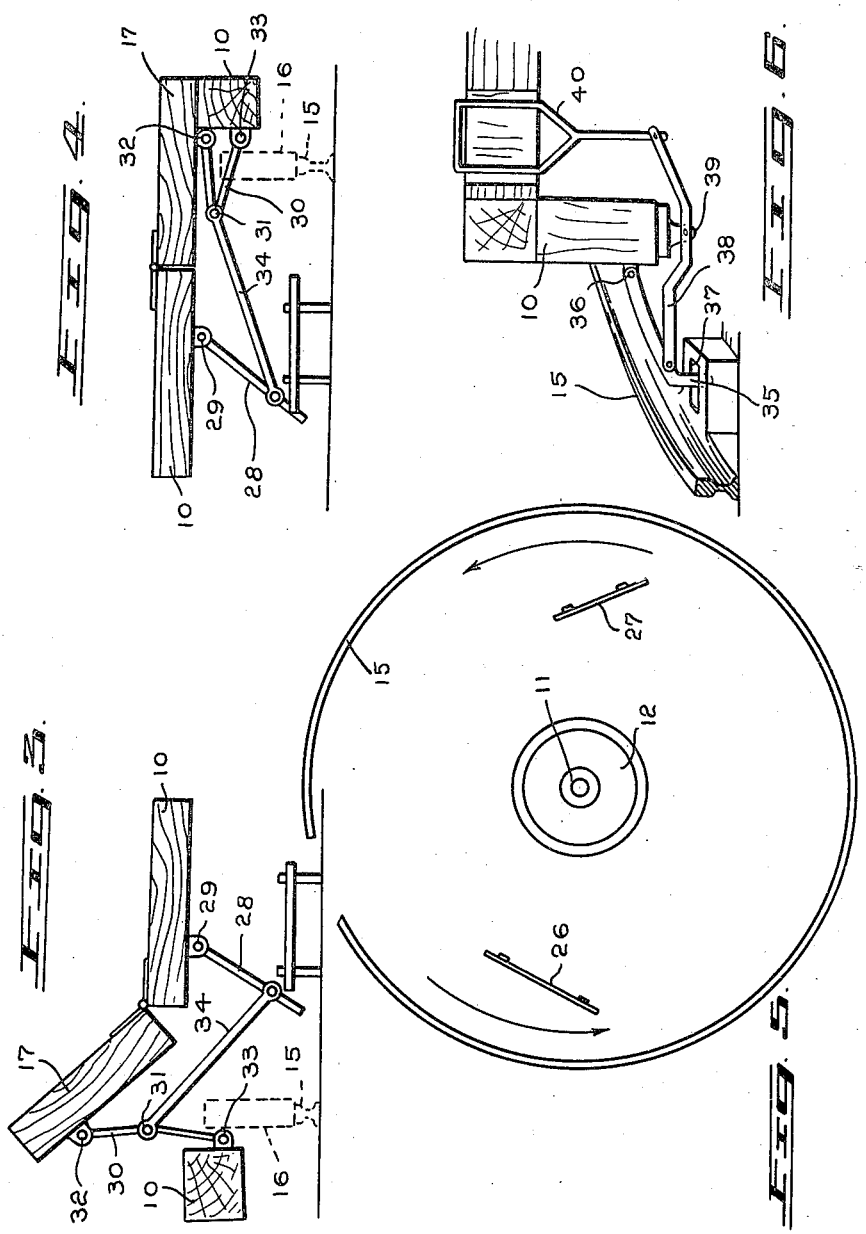

Patented Nov. 8, 1938

2,135,924

UNITED STATES PATENT OFFICE 2,135,924

TURNTABLE

Peter W. Toews, deceased, late of Swalwell, Alberta, Canada, by Peter B. Toews, Bircham, Alberta, Canada, and Henry L. Toews, Sunnyslope, Alberta, Canada, executors Application September 4, 1936, Serial No. 99,491
In Canada December 3, 1935

4 Claims. (Cl. 104—41)

This invention relates to new and useful improvements in a garage turntable. Its primary object being to design and construct a turntable for use in a garage having means associated therewith whereby the same is operated from the drive wheels of the vehicle thereon.

A further object of the invention is to provide automatic stop means for the vehicle driving onto the turntable. Said stop means being arranged to stop the said vehicle when the drive wheels thereof shall be in engagement with the turntable driving mechanism.

With these and other objects in view that may appear while the description proceeds the invention consists in the novel construction and arrangement of parts as hereinafter more specifically set forth, claimed and shown in the accompanying drawings forming part of this application and in which:

Fig. 2 is an elevation of the same showing an automobile in position to operate the same.

Fig. 3 is a detailed view of the stop operating means in the raised position.

Fig. 4 is a similar view of the opposite end showing the mechanism in the lowered position.

Fig. 5 is a plan view of the track showing the position of the mechanism actuating bars.

Fig. 6 shows an automatic catch device for the turntable.

Figure 1:
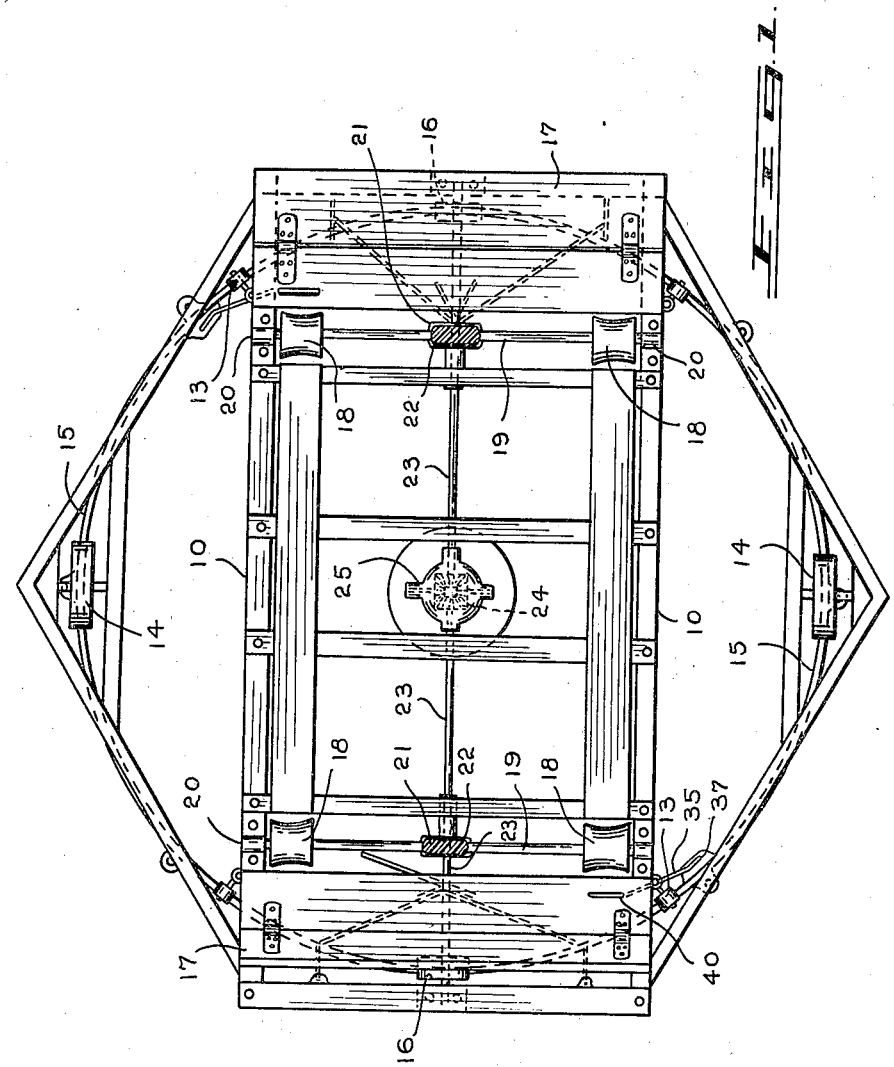
Fig. 1 is a general plan view of the improved garage turntable.

Referring more in detail to the drawings in which similar reference characters designate corresponding parts throughout the several views it will be seen the invention comprises a turntable structure 10 pivoted on a central pin 11 supported in a permanently fixed base 12. Said turntable structure is supported on rollers 13 and side wheels 14 which run on a circular track 15 and is revolved by drive wheels 16 which also run on the said track.

The driving power is derived from the vehicle which is to be turned and is particularly adapted for the purpose of turning an automobile. The same is driven onto the turntable until the front wheels engage a stop board 17 which, by prearrangement according to the wheel base of the vehicle brings the rear wheels onto drive drums 18. Said drums are mounted on a shaft 19 which is rotatable in bearings 20; and a worm gear 21 engaging a pinion 22 on the drive shaft 23 transfers the rotary motion to the drive wheels 16 which are mounted thereon. As the device is reversible it is operable from both ends which are built similar to each other. The drive shafts 23 are connected together by bevel gears 24 enclosed in a housing 25 in such a manner that the two shafts shall rotate simultaneously but in opposite directions to each other so that each of the drive wheels 16 shall be working at all times when the turntable is revolving.

The stop boards 17 are hinged to the turntable structure to be tilted upwards therefrom. These are operated automatically and independently of each other by two horizontal bars 26 and 27 which are angularly disposed to the center line of the turntable when in normal position. The operating mechanism for the stop boards comprises a trip bar 28 pivoted at 29 to the underside of the turntable. A folding push bar 30 hinged at its center 31 is pivoted at 32 to the underside of the stop board 17 and to the turntable structure at 33. A connecting rod 34 is pivotally fastened to the pivot 31 of the push bar 30 and to the trip bar 28 in such a manner that when the trip bar engages the horizontal bar 26 it will be actuated to move the connecting rod and push bar and so raise the stop board. The said horizontal bars are so arranged that the trip bars will engage the same on the rotation of the table. As will be seen the bar 27 is arranged to reverse the motion of the trip bar and so lower the opposite stop board.

An automatic catch is designed to hold the turntable in normal position until an automobile drives onto it. Said catch comprises a pivoted catch member 35 pivoted to the turntable structure at 36 and engaging a catch slot 37 fixed permanently to the floor or rail. The catch member is actuated by a lever 38 pivoted at 39 and connected to a treadle 40 which projects slightly above the floor of the turntable and is engaged by the wheel of the vehicle when passing over the same and thereby actuates the lever 38 to release the catch 35.

As will be observed in the drawings one stop board will be raised and one lowered when the automobile drives onto the turntable. As the front wheels of the automobile engage the stop board they engage the treadle 40, so that the catch member is released and the rear wheels set the turntable revolving mechanism into operation as previously explained. When the turntable has rotated through approximately 170° the stop board trip mechanism is actuated by the permanently fixed horizontal bars thereby lowering the raised board and raising the other board. The automobile is then able to drive off the turntable and the same is left in readiness for use again.

It is believed that the construction and advantages of the structure shown may be apparent from the foregoing paragraphs taken in conjunction with the accompanying drawings without further detailed description.

While the preferred embodiment of the invention has been disclosed it is understood that minor changes in the details of construction, combination and arrangement of co-operating parts may be resorted to within the scope of what is claimed without departing from the spirit of the invention.

What is claimed is:

1. In an automatic turntable for vehicles comprising a turntable structure revolvably mounted on a track, a platform extending across said turntable structure, stop boards hinged on each end of said platform, toggle joints having their free ends respectively pivoted to said stop boards and to the turntable structure, push rods connected to said toggle joints for collapsing and extending said joints to raise or lower said stop boards, trip bars pivoted at one end to said turntable and pivotally connected intermediate their length to said push rods and stationary means beneath said turntable adapted to be engaged by said trip bars upon revolving of the turntable, whereby said trip bars are rocked to actuate said push rods.

2. In an automatic turntable for vehicles comprising a turntable structure revolvably mounted on a track, a platform extending across said turntable structure, stop boards hinged on each end of said platform, toggle joints having their free ends respectively pivoted to said stop boards and to the turntable structure, push rods connected to said toggle joints for actuating the same to raise or lower the stop boards, trip bars pivoted at one end to said turntable and pivotally connected intermediate their length to said push rods, stationary means beneath said turntable adapted to be engaged by said trip bars upon revolving of the turntable, whereby said trip bars are rocked to actuate said push rods, and a catch member adapted to hold said turntable non-rotatable when a vehicle is driving on or leaving the same.

3. In an automatic turntable for vehicles comprising a turntable structure revolvably mounted on a track, hinged stop boards at opposite sides of the turntable, toggle joints connecting said stop boards with the turntable structure for raising and lowering said stop boards, push rods for actuating said toggle joints and stationary means adapted to be engaged by said push rods upon rotation of said turntable whereby the push rods are actuated.

4. In an automatic turntable for vehicles comprising a turntable structure revolvably mounted on a track, hinged stop boards at opposite sides of the turntable, toggle joints connecting said stop boards with said turntable for raising and lowering said stop boards, trip bars pivoted to said structure, connecting rods between said trip bars and toggle joints, and means engageable with said trip bars, upon rotation of said turntable for actuating the trip bars.

PETER B. TOEWS,
HENRY L. TOEWS,
*Executors of the estate of Peter W. Toews, Deceased.*